United States Patent
Sumrall

[19]

[11] Patent Number: 6,109,675
[45] Date of Patent: Aug. 29, 2000

[54] HINGED MEMBER FOR A REAR IMPACT GUARD

[75] Inventor: Doyle Sumrall, Doylestown, Ohio

[73] Assignee: Waltco Truck Equipment Co., Tallmadge, Ohio

[21] Appl. No.: 09/103,093

[22] Filed: Jun. 23, 1998

[51] Int. Cl.[7] .................................................. B60R 19/02
[52] U.S. Cl. ......................... 293/118; 293/117; 293/125
[58] Field of Search ................................. 293/118, 117, 293/125, 142, 155, 1, 34, 35, 36, 102; 280/763.1, 764.1, 765.1, 766.1

[56] References Cited

U.S. PATENT DOCUMENTS

| | | | |
|---|---|---|---|
| 2,541,364 | 2/1951 | Jurasevich | 293/125 |
| 3,451,710 | 6/1969 | Savell | 293/118 |
| 3,993,229 | 11/1976 | Summers | 293/118 X |
| 4,247,138 | 1/1981 | Child | 293/103 |
| 4,264,093 | 4/1981 | Long | 293/103 |
| 4,305,694 | 12/1981 | Chan | 293/118 X |
| 4,359,239 | 11/1982 | Eggert, Jr. | 293/132 |
| 4,360,228 | 11/1982 | Rasmussen et al. | 293/118 |
| 4,582,351 | 4/1986 | Edwards | 293/118 |
| 4,991,890 | 2/1991 | Paulson | 293/118 |
| 5,507,546 | 4/1996 | Holley | 293/133 |
| 5,632,518 | 5/1997 | Kendall | 293/103 |
| 5,673,953 | 10/1997 | Spease | 29/118 |
| 5,678,872 | 10/1997 | Slater | 293/118 |

*Primary Examiner*—Joseph D. Pape
*Attorney, Agent, or Firm*—Emerson & Associates; Roger D. Emerson; John M. Skeriotis

[57] ABSTRACT

A horizontal impact member for use with a rear impact guard on a semi-trailer truck is disclosed. The horizontal impact member is connected to a standard rear impact guard by a hinge. This design is for use with a liftgate that is mounted to the rear of the semi-trailer truck. As the liftgate travels in a downwardly vertical direction it contacts the horizontal member which rotates along its hinge point. The addition of a roller to the horizontal member reduces the amount of wear upon the horizontal member and the liftgate.

7 Claims, 4 Drawing Sheets

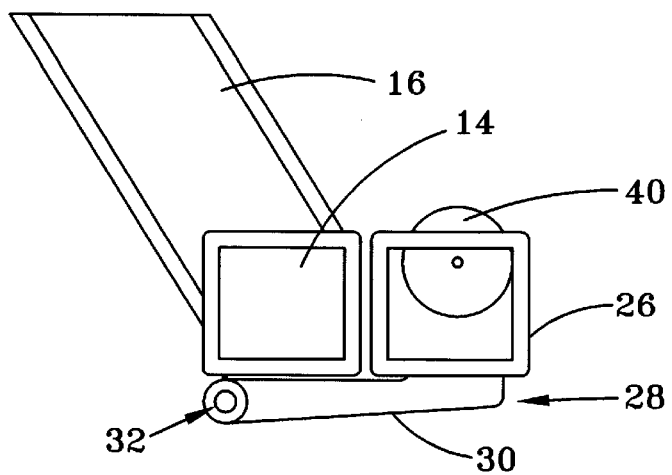
FIG-5
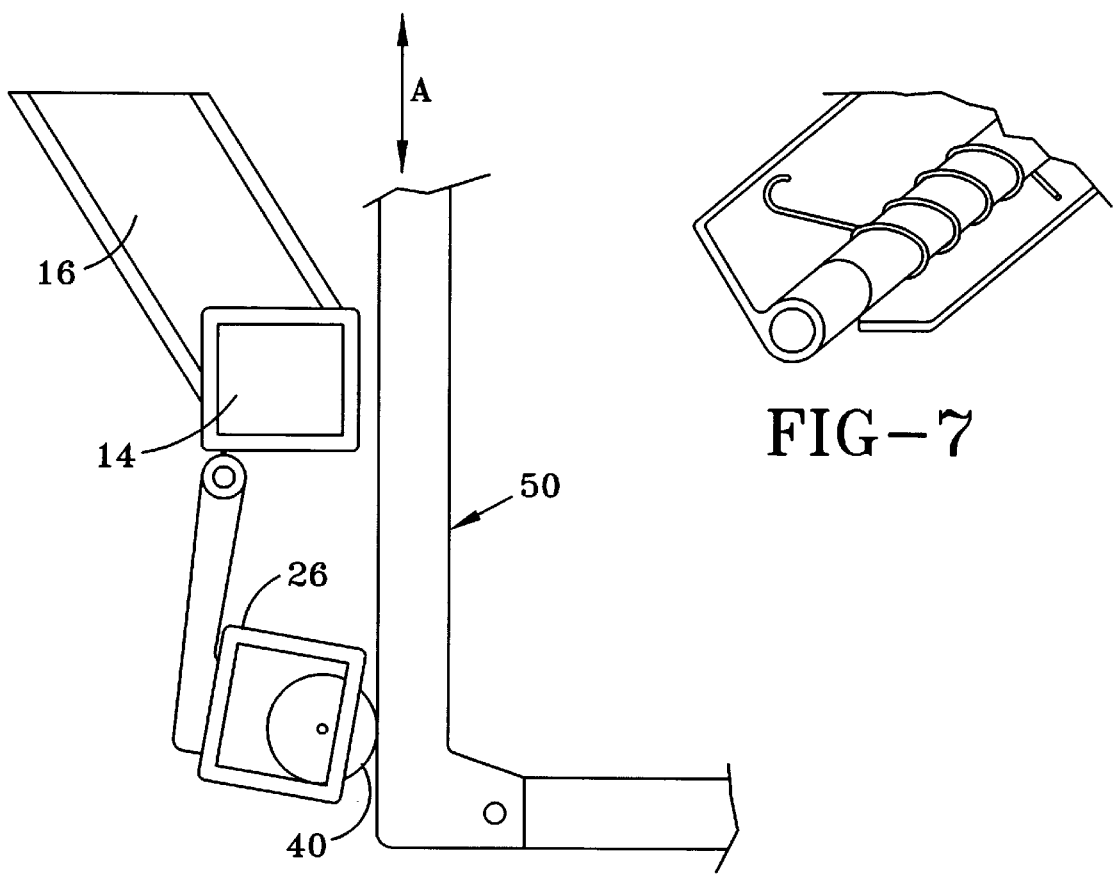
FIG-7
FIG-6

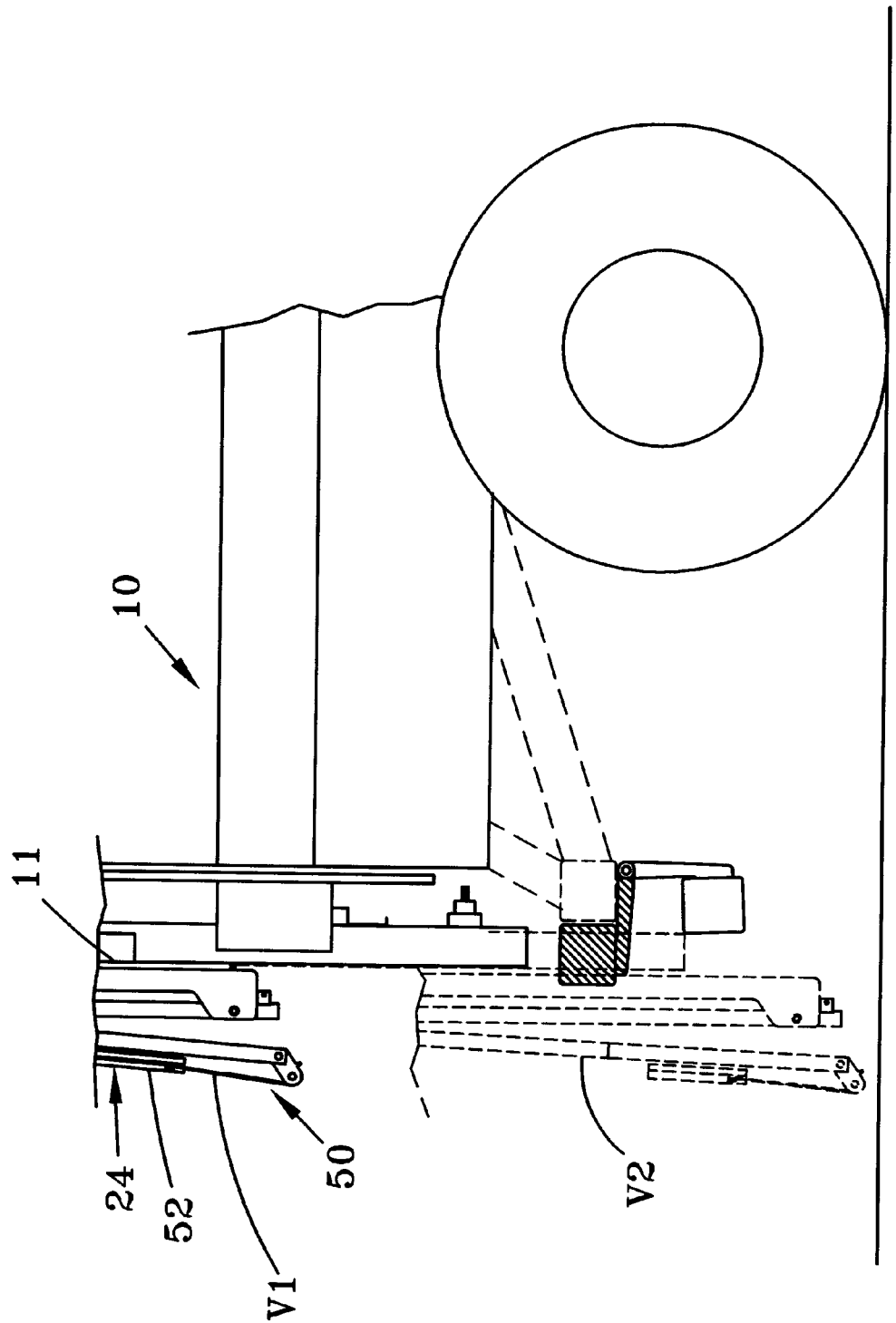

6,109,675

HINGED MEMBER FOR A REAR IMPACT GUARD

BACKGROUND OF THE INVENTION

I. FIELD OF THE INVENTION

This invention relates to a hinged member for a rear impact guard and, more particularly, a hinged member for a rear impact guard for use with a liftgate on the rear of a semi trailer.

II. DESCRIPTION OF THE RELATED ART

The present invention contemplates a new and improved rear impact guard; a system including a rear impact guard, a liftgate, a hinged member; and a device adaptable for use with a rear impact guard, all for use with a vehicle such as a semi-trailer truck. The present invention is simple in design, effective in use, and overcomes the foregoing difficulties and others while providing better and more advantageous overall results.

The present invention relates to a bumper for a truck providing underride protection. The semi-trailers are elevated to a level whereby a typical automobile can pass under the trailer frame. Therefore, where the automobile collides with the rear of the semi-trailer the front end of the automobile travels under and below the semi-trailer. The height of the semi-trailer is such that the windshield of the automobile is the first element of the automobile to contact the semi-trailer. Thus, upon impact of the automobile with the semi-trailer great injury results. To minimize and/or eliminate the ability of the vehicles to travel under the semi-trailer trucks have a rear impact guard mounted to the rear of the semi-trailer. The rear impact guard is typically mounted under the semi-trailer. Various prior art patents disclose a rear impact guard mounted to the underside of the semi-trailer. For example, U.S. Pat. No. 5,507,546 entitled UNDERRIDE PROTECTION BUMPER discloses a vehicle bumper which provides protection against other vehicles underriding the vehicle. The bumper structure has a pivoting arrangement and breakable links. The bumper protector is designed such that upon collision of a vehicle with the bumper protector the pivoting of the bumper lifts the rear of the truck being hit and smashes downwardly on the front end of the impinging vehicle thus not allow the impinging vehicle to travel under the semi-trailer.

Other types of rear impact guards are disclosed within the prior art aiming to absorb the shock between the impact of the vehicle against the rear impact guard. U.S. Pat. No. 4,247,138 entitled SHOCK ABSORBING APPARATUS FOR VEHICLES discloses a rear impact guard having a shock absorbing device. The shock-absorbing device allows the arm of the rear impact guard to deflect toward the front of the semi-trailer truck thus absorbing some of the impact of the collision.

A yet further rear impact guard is disclosed within U.S. Pat. No. 5,673,953 entitled BREAKAWAY ICC BUMPER. The patent discloses a movable bumper having a one-way hinged connection with biasing springs with pulley/cable connectors. This invention is aimed at dealing with a slightly different problem of rear impact guards. Due to the nature of the rear impact guard being mounted below the underside of the semi-trailer roadside obstructions contact these impact guards with considerable force. Thus, the impact guard and the vehicle are damaged. For example, a dip in the road can cause the impact guard to impact the road, thus causing damage to the impact guard. To deal with this problem, U.S. Pat. No. 5,673,953 discloses utilizing a hinged connection which is biased in one direction by transversally mounted tension springs. Thus, when an obstruction contacts the bumpers bottom portion it moves at its upper hinged area against the biasing action of the springs and attached pulley link. This causes the bumper's lower end to move outwardly away from the vehicle.

Trucks subject to the jurisdiction of the U.S. Interstate Commerce Commission (ICC) currently have regulations for the rear impact guards. A relatively new regulation requires that the rear impact guard be mounted no greater than twelve inches (12') (305 mm) from the rear of the trailer extremity. This regulation presents a problem to those trucks utilizing a liftgate. Powered liftgate systems have been in use for many years. These liftgates are mounted on the rear of the truck, and more specifically, as close to the rear of the semi-trailer as possible. The liftgate aids the operator in shipping and receiving articles and loading articles within the semi-trailer. With the regulations that the rear impact guard be within twelve inches (12') (305 mm) of the rear extremity of the trailer, a problem arises with the operation of the liftgate.

In operation, the liftgate travels in an up and down vertical direction. The operator operates the liftgate utilizing a motorized system. The liftgate has a travel range from the road to the bed or inside of the semi-trailer. Therefore, when loading heavy items these items can be loaded from the road directly onto the liftgate platform which is parallel and contacts the surface of the road. The liftgate then operates in an upwardly vertical direction to at least a level parallel with the bed of the trailer. The item is then moved from the platform of the liftgate to within the bed of the semi-trailer thus providing an efficient manner of loading an item. At the receiving end, the reverse steps are taken to unload the item it the same manner as loading the item.

The travel of the liftgate in this upwardly and downwardly vertical direction presents a clearance difficulty in the travel of the liftgate with respect to the rear impact guard. Upon traveling in its upwardly and downwardly vertical direction, the liftgate impacts the rear impact guard thus impinging its travel.

The main object of the present invention is to overcome the aforementioned difficulty of using a liftgate with a rear impact guard.

SUMMARY OF THE INVENTION

In accordance with the present invention, a new and improved rear impact guard having a hinged member is provided which overcomes the aforementioned difficulties as well as providing other benefits and advantageous that are apparent to one skilled in the art.

A device for a rear impact guard for a vehicle is disclosed having a first horizontal impact member and a mounting means to mount the rear impact guard to a vehicle. The device comprises a second horizontal impact member that is parallel with, and adjacent to, the first horizontal impact member. The second horizontal impact member is hinged to the first horizontal impact member. The second horizontal impact member rotates about the hinge toward the front of the vehicle. The second horizontal impact member rotates below the first horizontal impact member. The second horizontal impact member can be rotatable greater than or less than 90° below the first horizontal impact member. The hinge can be mounted below the first horizontal impact member or between the first and second horizontal impact members.

An alternative embodiment of the aforementioned device for rear impact guard also contains a roller that is mounted within the second horizontal impact member and acts as an impact-absorber. Also disclosed is an improved impact guard system for a vehicle whereby the system comprises a liftgate that is mounted to the rear of the vehicle having a vertical member and a platform. The liftgate travels in an upwardly and downwardly vertical direction. The system also comprises an impact guard similar to the impact guard disclosed above. In use, the liftgate impacts the impact guard when traveling in its downwardly vertical direction causing the second horizontal impact member to rotate about the hinge means. The second horizontal impact member thus rotates below the first horizontal member and towards the front of the vehicle. In an alternative embodiment of the system, a roller can also be mounted within the second horizontal impact member and act as an impact absorber.

Also disclosed is an improved impact guard for a vehicle wherein the impact guard comprises first and second horizontal impact members, a mounting means to mount the impact guard to the rear of the vehicle, and a hinge means that hinges the second horizontal impact member to the first horizontal impact member. A liftgate is mounted to the vehicle whereby the liftgate impacts the improved impact guard while traveling in a downwardly vertical direction similar to that disclosed above. An alternative embodiment of the improved impact guard is also similar to that disclosed above having an impact-absorbing means and having alternative ways of mounting the hinge.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein:

FIG. 5 is a side view of the alternative embodiment of FIG. 4;

FIG. 6 is a side view showing the liftgate in a lowered position;

FIG. 7 is a perspective view of an alternative embodiment of the hinge means of the present invention; and, FIG. 8 is a side view showing the liftgate traveling in a downwardly vertical direction and thus contacting the second horizontal impact member.

DESCRIPTION OF THE PREFERRED EMBODIMENT

Figure 1:
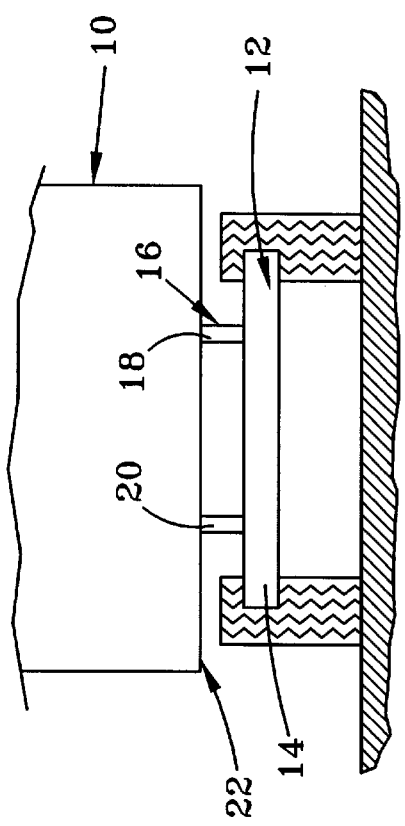
FIG. 1 is a rear view of a truck having a rear impact guard mounted to the trailer.

Referring now to the drawings, which are for purposes of illustrating a preferred embodiment of the invention only, and not for purposes of limiting the invention, FIG. 1 shows a truck semi-trailer 10 having a rear impact guard 12 mounted thereon. While the disclosure of the preferred embodiment is discussed with reference to a truck semi-trailer, it is well within the scope of this invention that this can be applied to other vehicles. The truck semi-trailer 10 is constructed in a manner known within the art. The rear impact guard 12 is mounted to an underside 22 of the semi-trailer 10 also by known methods within the art.

The rear impact guard 12 comprises a horizontal impact member 14 and a mounting means 16 to mount the impact guard 12 to the rear of the semi-trailer 10. As shown within FIG. 1, the mounting means 16 comprises two vertical members 18, 20 that are mounted to the underside 22 of the trailer 10. The vertical members 18, 20 are attached to the horizontal impact member 14 by methods known within the art such as welding, screws, and are integral with the horizontal impact member 14.

The members thus far discussed are with respect to the rear impact guard 12 may be constructed of high strength steel and are typically secured together by welding or some other means at their corresponding intersections. The members are typically tubing and, more specifically, square tubing or rectangular tubing. In the preferred embodiment, the horizontal impact member 14 is square having a four by four-inch cross section. The vertical members 18, 20 are square having a three by three-inch cross section. Other dimensions may also be used and are within the scope of this invention.

Figure 2:
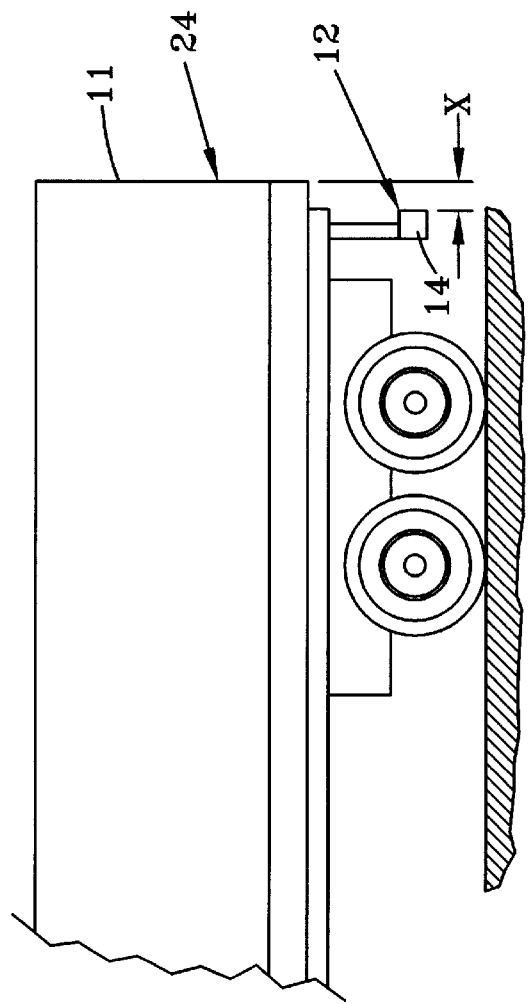
FIG. 2 is a side view of a semi-trailer having a rear impact guard mounted thereupon.

FIG. 2 shows a side view of the semi-trailer 10 incorporating the configuration requirements as set forth within the Federal Register, Volume 61, No. 16. The configuration requirements for a rear impact guard state that the horizontal impact member 14 must be located no greater than twelve inches (12") (305 mm) from the rear extremity 24 of the semi-trailer 10. This distance is denoted as X within FIG. 2.

FIG. 8 shows a liftgate 50 mounted on the rear of the semi-trailer 10. The liftgate 50 is shown in solid lines in a first position $V_1$ as the liftgate 50 travels in a downwardly vertical direction to a position $V_2$ denoted by the break lines, the liftgate 50 contacts the second horizontal impact member 26 thus impinging its travel until its rotation.

Figure 3:
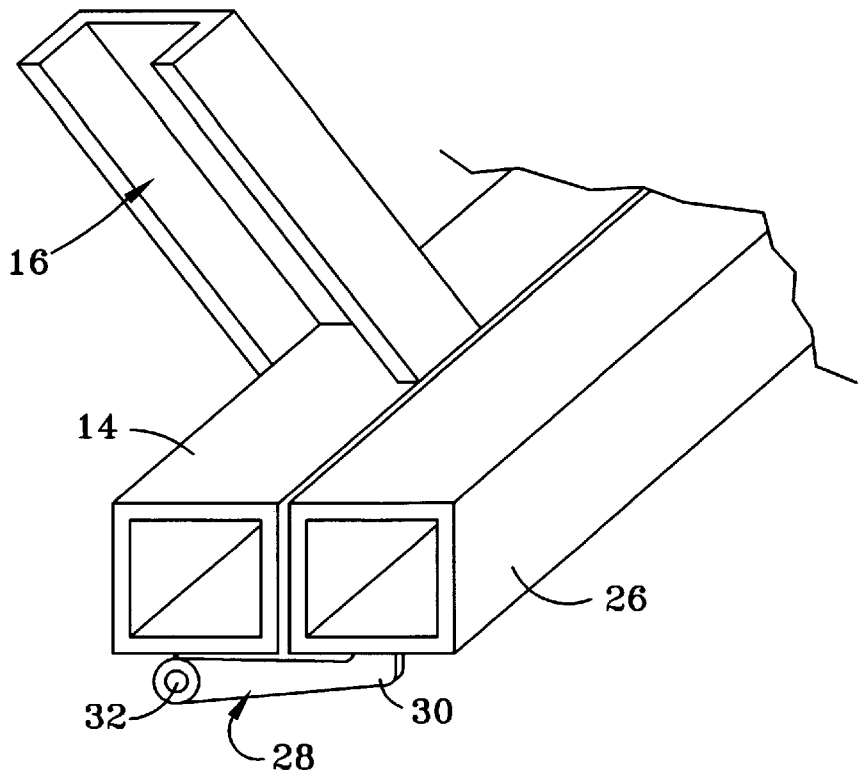
FIG. 3 is a perspective view showing the hinged member of the present invention.

With the above in mind, the applicant's invention will now be disclosed to overcome the above inherent problem using a liftgate and continuing to meet the criteria proposed above. FIG. 3 shows a first embodiment of the present invention. A first horizontal impact member 14 is shown mounted to a mounting means 16 which mounts to the underside 22 of the trailer 10. A hinge means 28 is mounted to the first horizontal impact member 14. The hinge means 28 hinges the second horizontal impact member 26 to the first horizontal impact member 14. The hinge means 28 also supports the second horizontal impact member 26. Thus, the second horizontal impact member 26 is attached to the hinge means 28. The hinge means 28 allows the second horizontal impact member 26 to rotate below the first horizontal impact member 14 in a direction towards the front of the truck. In its most preferred embodiment, the hinge means comprises an arm 30, a spring 31, and a hinge point 32. The arm 30 is connected to the second horizontal impact member by means known within the art, such as welding, etc. Preferably, the arm 30 is made of the same material as that of the horizontal impact members 14, 26. However, dissimilar materials are also within the scope of this invention. The spring 31 is in compression when the liftgate impacts the second horizontal impact member 26 in its downwardly vertical direction. When the liftgate 50 travels upwardly, the spring 31 acts to return the second horizontal impact member 26 to its original position. The spring 31 also acts to absorb the impact from the liftgate 50.

Again, in its most preferred embodiment, the hinge means 28 comprises two hinges located at different points along the lengths of the impact members 14, 26. Additional hinge means 28 or one hinge means is within the scope of this invention. The hinge means 28 must be such that it can support a second horizontal impact member 26 and also have the ability to aid in absorbing the contact between the liftgate 50 and the second horizontal impact member 26. Therefore, having more than one hinge means is preferable to aid the hinge in support, rotation, and impact-absorption.

Figure 4:
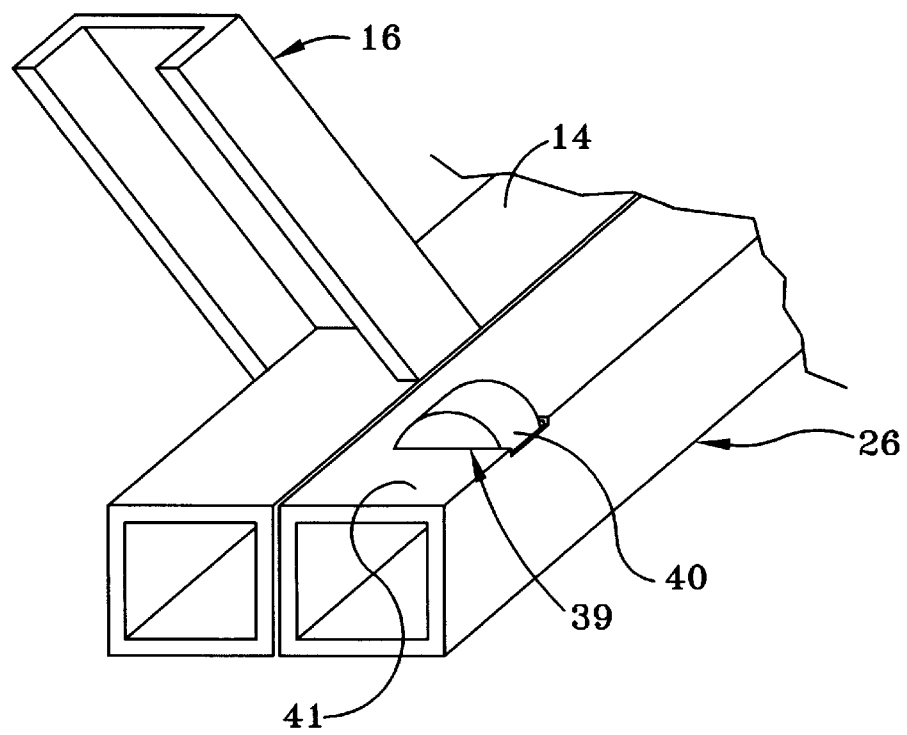
FIG. 4 is a perspective view of an alternative embodiment of the present invention.

With reference to FIGS. 4–6, an alternative embodiment of the present invention is shown. The alternative embodiment includes an impact-absorbing means 39. In its most preferred embodiment, a roller 40 is mounted within the second horizontal impact member 26. The impact-absorbing means 39 absorbs the impact of the liftgate as it travels in a downwardly vertical direction. Thus, as shown within FIG. 4, the liftgate travels in a downwardly vertical direction end the addition of the roller 40 provides a rolling contact between the roller 40 and the liftgate 50. The roller 40 is seated within the second horizontal impact member 26 and extends above face 41 of the second horizontal impact member 26. Thus, the liftgate 50 initially contacts the roller 40. As the liftgate 50 continues its travel downwardly, the roller 40 rotates about its axis providing a rolling contact with the liftgate 50. The addition of the roller 40 reduces the wear upon the second horizontal impact member 26 and the liftgate 50. The roller 40 is mounted within the second horizontal impact member 26. The roller 40 can be secured to the second horizontal impact member 26 by means known within the art. To ensure stability, a further alternative embodiment can incorporate more than one roller 40. The additional rollers 40 will be spaced apart along the length of the second horizontal member 26. The rollers 40 absorb the impact of the liftgate 50 and thus additional rollers, provide a greater rolling contact and share the impact load of the lift gate 50. This is an important criteria with respect to wear, life and impact-absorption of the rollers 40. However, one roller 40 could also be used.

With reference to FIGS. 6 and 8, in operation the liftgate 50 travels in an upwardly and downwardly vertical direction as shown by arrow A. When traveling in a downward direction, the liftgate 50 contacts the second horizontal impact member 26 and, in the alternative embodiment, the roller 40. As the liftgate 50 travels downwardly the second horizontal impact member 26 rotates along the hinge point 32 to a point below the first horizontal impact member 14 as shown within FIG. 8. In the preferred embodiment (without roller 40) the second horizontal impact member 26 rotates less than 90° below the first horizontal impact member 14. In the alternative embodiment with the addition of roller 40, the second horizontal impact member 26 is rotatable greater than 90° below the first horizontal impact member 14 as shown within FIG. 6. However, in all embodiments the second horizontal impact member 26 rotates below the first horizontal impact member 14 and in a direction towards the front of the vehicle. By traveling below the first horizontal impact member 14 this provides clearance for the liftgate 50 to continue its travel downwardly.

As the liftgate 50 travels upwardly to its position $V_1$ the second horizontal impact member 26 rotates upwardly to its initial position, parallel to, and adjacent to, the first horizontal impact member 14. The second horizontal impact member 26, in its preferred embodiment, contacts the first horizontal impact member 14. This aids in ensuring that upon contact with the rear impact guard the first and second horizontal impact member 14, 26 act as a unitary embodiment. This is important so that no farther injury can come from flying debris if there is a gap between the first and second horizontal impact members. However, allowing a clearance space between the first and second horizontal impact members 14, 26 is also well within the scope of this invention. This would allow, where needed, a clearance between the first and second horizontal impact members 14, 26 for the travel of the second horizontal impact member 26 below the first horizontal impact member 14.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. An improved impact guard for a vehicle, the vehicle having a front, a rear, a liftgate mounted to the rear of the vehicle, the liftgate having a vertical member and a platform, the liftgate able to travel in an upwardly and downwardly vertical direction, the impact guard comprising:

a first and second horizontal impact member;

a mounting means to mount said impact guard to the rear of the vehicle, a hinge means to hinge said second horizontal impact member to said first horizontal impact member; and, whereby the liftgate impacts said impact guard when traveling in a downwardly vertical direction causing said second horizontal impact member to rotate about said hinge means.

2. The improved impact guard as recited within claim 1, further comprising:

an impact-absorbing means, said impact-absorbing means mounted within said impact guard; and, whereby said liftgate impacts said impact-absorbing means of said impact guard.

3. The improved impact guard as recited within claim 1, wherein said impact-absorbing means further comprises a roller mounted within said second horizontal impact member.

4. The improved impact guard as recited within claim 1, wherein said hinge means is mounted below said first horizontal impact member.

5. The improved impact guard as recited within claim 1, wherein said hinge means is mounted between said first and said second horizontal impact member.

6. The improved impact guard as recited within claim 1, wherein said second horizontal impact member is rotatable greater than 90° below said first horizontal impact member.

7. The improved impact guard as recited within claim 1, wherein said second horizontal impact member is rotatable less than 90° below said first horizontal impact member.

\* \* \* \* \*